(12) United States Patent
Myhr

(10) Patent No.: US 10,605,058 B2
(45) Date of Patent: Mar. 31, 2020

(54) SYSTEM FOR INJECTING FLUE GAS TO A SUBTERRANEAN FORMATION

(71) Applicant: International Energy Consortium AS, Oslo (NO)

(72) Inventor: Gunnar Myhr, Oslo (NO)

(73) Assignee: INTERNATIONAL ENERGY CONSORTIUM AS, Oslo (NO)

( * ) Notice: Subject to any disclaimer, the term of this patent is extended or adjusted under 35 U.S.C. 154(b) by 253 days.

(21) Appl. No.: 15/543,797

(22) PCT Filed: Jan. 14, 2016

(86) PCT No.: PCT/NO2016/050004
§ 371 (c)(1),
(2) Date: Jul. 14, 2017

(87) PCT Pub. No.: WO2016/114672
PCT Pub. Date: Jul. 21, 2016

(65) Prior Publication Data
US 2017/0370196 A1    Dec. 28, 2017

(30) Foreign Application Priority Data
Jan. 17, 2015    (NO) .................................... 20150079

(51) Int. Cl.
*E21B 43/16*    (2006.01)
*C09K 8/594*    (2006.01)

(52) U.S. Cl.
CPC ............ *E21B 43/164* (2013.01); *C09K 8/594* (2013.01); *Y02P 90/70* (2015.11)

(58) Field of Classification Search
CPC .............................. E21B 43/164; E21B 43/166
See application file for complete search history.

(56) References Cited

U.S. PATENT DOCUMENTS

| | | | |
|---|---|---|---|
| 7,770,640 B2* | 8/2010 | Kresnyak | E21B 41/0064 166/267 |
| 7,938,182 B2* | 5/2011 | Turta | E21B 43/164 166/266 |
| 2010/0258401 A1 | 10/2010 | Prim | |

FOREIGN PATENT DOCUMENTS

| | | |
|---|---|---|
| EP | 1 816 314 | 8/2007 |
| WO | 99/64719 | 12/1999 |
| WO | 2007/090275 | 8/2007 |

(Continued)

OTHER PUBLICATIONS

Shokoya et al., "Effect of CO2 Concentration on Oil Recovery in Enriched Flue Gas Flood", The Petroleum Society's 6th Canadian International Petroleum Conference, Calgary, Alberta, Canada, Jun. 7-9, 2005, pp. 1-17.

(Continued)

*Primary Examiner* — Catherine Loikith
(74) *Attorney, Agent, or Firm* — Lucase & Mercanti, LLP

(57) ABSTRACT

A system (100) for injecting flue gas to a subterranean formation, wherein the system (100) is configured to receive an initial mixture of $N_2$, $CO_2$ and less than 2% other components and comprises a compressor (110) for obtaining and maintaining a predetermined downhole pressure. The system (100) has a control system (200) for maintaining the amount of $CO_2$ in an injection mixture in the range 12-90% and can be configured for EOR.

4 Claims, 2 Drawing Sheets

(56) References Cited

FOREIGN PATENT DOCUMENTS

WO 2013/036132 3/2013

OTHER PUBLICATIONS

Godwin et al., "A Small Independent Producer's Design, Construction and Operation of a Flue Gas Injection Project, East Edna Field, Okmulgee County, Oklahoma" The 1998 SPE/DOE Eleventh Symposium on Improved Oil Recovery held in Tulsa, Oklahoma, USA, Apr. 19-22, 1998.
Shokoya et al., "Effect of Oil and Flue-Gas Compositions on Oil Recovery in the Flue-Gas/Light-Oil Injection Process", The 2005 SPE (Society of Petroleum Engineers) Annual Technical Conference and Exhibition held in Dallas, Texas, USA, Oct. 9-12, 2005, pp. 1-14.
Goos et al., "Phase diagrams of $CO_2$ and $CO_2$-$N_2$ gas mixtures and their application in compression processes", 10th International Conference on Greenhouse Gas Control Technologies (GHGT-10), Sep. 19-23, 2010.
Radosz et al., "Flue-Gas Carbon Capture on Carbonaceous Sorbents: Toward a Low-Cost Multifunctional Carbon Filter For "Green" Energy Producers" Soft Materials Laboratory, Department of Chemical and Petroleum Engineering, University of Wyoming, Laramie, Wyoming 82071, vol. 47, pp. 3783-3794 Apr. 29, 2008.
International Search Report dated May 17, 2016 in corresponding International (PCT) Application No. PCT/NO2016/050004.
Search Report dated Oct. 26, 2016 in corresponding Norwegian Patent Application No. 20150079.

\* cited by examiner

SYSTEM FOR INJECTING FLUE GAS TO A SUBTERRANEAN FORMATION

BACKGROUND

Field of the Invention

The present invention concerns a system for injecting flue gas to a subterranean formation.

Prior and Related Art

In the following description and claims, a subterranean formation is any geological formation that can be used for storing $N_2$ and $CO_2$. Examples include aquifers and reservoirs. Here, a reservoir means a layer of porous rock, e.g. sandstone, limestone or shale, contain hydrocarbons, i.e. oil and/or natural gas.

An oilfield comprises one or more production wells, and may be located onshore or offshore. Each production well has a riser for conveying oil from a reservoir to a rig or platform on the surface. In some instances, the pressure in the reservoir is sufficient to force hydrocarbons, including oil, to the surface. However, it may be necessary or desired to inject a fluid into the reservoir in order to maintain or increase the pressure in the reservoir, and thereby increase the amount of hydrocarbons produced from the reservoir. The fluid, i.e. liquid or gas, is injected into the reservoir through one or more injection wells on the oil field. The injection wells are similar to the production wells. Indeed, a former production well may serve as injection well at a later time in order to force oil or gas toward new production wells.

The process of injecting a fluid to increase production of hydrocarbons, i.e. from a field is known as enhanced oil recovery (EOR). Both production of hydrocarbons and EOR may involve phase transitions. For example, methane ($CH_4$) is gaseous at standard conditions 1 bar and 298 K, but may be liquid in a subterranean formation or solid under other conditions. The phase transitions also depend on the fluid composition. For example, methane may form methane clathrate or 'hydrate' in the presence of water. Phase transitions and their associated phase diagrams are further discussed below.

As used herein, flue gas is the gas produced by any combustion process, e.g. a fireplace, an oven, a power plant or a steam generator. A typical flue gas from a standard combustion in air at atmospheric pressure may contain, for example, 70-75% $N_2$, 10-15% $O_2$, 5-10% $CO_2$, and a small percentage of other components. All percentages here and in the following are by mole. The other components in the flue gas depend mainly on the fuel and may include soot, CO, nitrogen oxides, sulphur oxides, noble gases etc. Fuel gas from industrial combustion, e.g. a power plant, is often treated to remove sulphur, nitrogen oxides (NOx), etc. These processes are known as 'scrubbing', and are not described in detail herein. Rather, it is assumed that an input gas may comprises a mixture of mainly $N_2$, $O_2$ and $CO_2$ and less than 2% other components.

Of these, $CO_2$ is of particular interest because it contributes to the greenhouse effect. Several techniques have been proposed for so-called carbon capture and storage (CCS), including long time storage in aquifers or depleted hydrocarbon reservoirs. As the pressure and temperature at the reservoir differ significantly from standard conditions, i.e. 1 bar and 298 K, some or all components in a mixture may change phase during compression and injection. Moreover, interaction between the components may cause the phase diagrams different for different concentrations of the constituents. For example, some applications use pure $CO_2$, which has a well known phase diagram and which is most likely liquid at the pressures and temperatures of a reservoir. Due to low compressibility at these conditions, pure $CO_2$ may be well suited for EOR applications. Moreover, the phase diagram can be used to avoid undesired clogging, i.e. a phase transition to solid state in pumps, pipes etc., during purification and compression. A major disadvantage of using pure $CO_2$ is the cost associated with purification.

Mixtures of $CO_2$ and other gases have less defined properties, in general because interactions between constituents cause the mix to behave differently than each single component. That is, each mixture has a phase diagram that depends on the components and their relative concentrations. A disadvantage of such systems is that different compositions of similar constituents may have different phases at identical pressure and temperature. Thus, the composition of the mixture must be controlled in addition to pressure and temperature. Some systems are relatively well studied. There is no guarantee that all possible fractions of $CO_2$ in a mixture behave in the same manner. In addition, a particular mixture suitable for deposit in an aquifer may not be suited for EOR.

As an alternative to CCS methods using amines or other methods for extracting $CO_2$, a mixture of $CO_2$ and other gases can be stored after far less extensive treatment. The flue gas with mainly $N_2$, $O_2$ and 5-10% $CO_2$ mentioned above is an example of a gas that may be deposited, e.g. in an aquifer. To avoid corrosion, bacterial growth etc., it may be desirable to reduce the amount of $O_2$. This may also increase efficacy. For example, by manipulating a combined cycle or two step combustion process, where the flue gas from e.g. the gas turbine is used in a closed loop in subsequent combustion processes, it is possible to obtain $O_2$ levels<<1%. By utilizing high pressure in the HRSG or boiler unit and fuel with gas (e.g. pure $CH_4$), $O_2$ levels could become at the ppm level. In this way the fume gas may comprise approximately 87% $N_2$, 12% $CO_2$ and small amounts of other components. Such methods are provided in, for example, WO99/64719 and NO 332044.

Phase diagrams for $N_2$—$CO_2$ mixtures with over 90 mole % $CO_2$ are known from Goos et al., "Phase diagrams of $CO_2$ and $CO_2$—$N_2$ gas mixtures and their application in compression processes", Energy Procedia 4 (2011) 3778-3785, presented at the 10th International Conference on Greenhouse Gas Control Technology (GHGT-10), and available online since 1 Apr. 2011. However, obtaining high concentrations of $CO_2$ tends to impose costs, e.g. for membranes or other equipment to remove $N_2$ and/or time for achieving the desired result with lower process capacity.

The objective of the present invention is to provide a system solving at least one of the problems above while retaining the benefits of prior art.

SUMMARY OF THE INVENTION

This is achieved by a system according to claim 1.

More particularly, the above objective is achieved by a system for injecting flue gas to a subterranean formation, wherein the system is configured to receive an initial mixture of $N_2$, $CO_2$ and less than 2% other components and comprises a compressor for obtaining and maintaining a predetermined downhole pressure. The system is distinguished by a control system for maintaining the amount of $CO_2$ in an injection mixture in the range 12-90%.

The initial mixture is output from systems and processes briefly discussed in the introduction, i.e. a mixture comprising less than 2% oxygen and other components. It has been found, surprisingly, that mixtures of $N_2$ and $CO_2$ with as little as 12% $CO_2$, are comparable to water for maintaining the pressure in a reservoir, and that mixtures with 20% or more $CO_2$ are practically indistinguishable from water in this respect. As a larger amount of $N_2$ may remain in the output gas, i.e. the gas to be injected, the costs associated with removing $N_2$ are decreased. These results are also useful for injection into other subterranean formations, notably aquifers.

Preferably, the amount of $CO_2$ in the injection mixture is maintained in the range 20-90%. In this range, the properties of the mixture is nearly indistinguishable from water as pressure support for typical reservoir pressures.

In a preferred embodiment, the compressor and injection mixture are configured for enhanced oil recovery.

The control system may comprise a membrane for reducing the amount of $N_2$. As the $N_2$ exits into the ambient air, the concentration of $CO_2$ in the injection mixture increases.

In addition or alternatively, the control system may comprise a mixer for adding $CO_2$ to the initial mixture.

Additional features and benefits appear from the detailed description and accompanying claims.

BRIEF DESCRIPTION OF THE DRAWINGS

The invention will be described in greater detail by means of exemplary embodiments and reference to the accompanying drawings, in which.

DETAILED DESCRIPTION OF A PREFERRED EMBODIMENT

Figure 1:
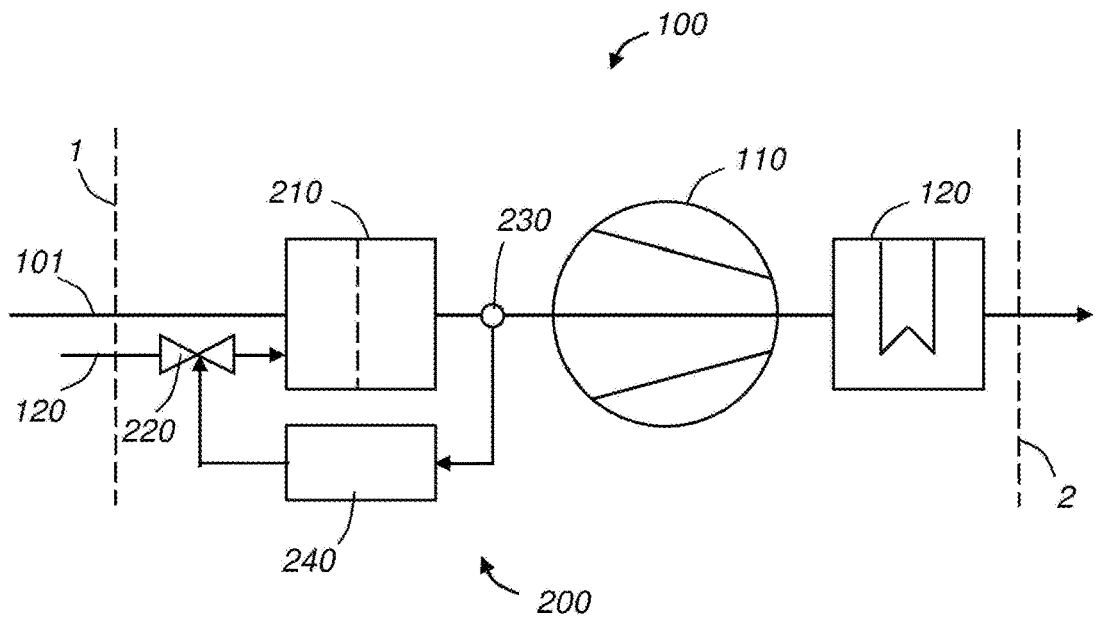
FIG. 1 illustrates a system according to the invention.

FIG. 1 is a schematic illustration of a system 100 according to the invention. As indicated in the introduction, a flue gas from any combustion can be treated to provide a suitable gas mixture for the present invention. At the system boundary 1, a treated flue gas containing $N_2$, <12% $CO_2$ and <2% other components is assumed. For example, a combined cycle may be present upstream on a main feed 101 as described. Similarly, an afterburner or other device (not shown) to reduce the $O_2$ content may be present upstream on a supply line 250 for adding $CO_2$ from an external source. Downstream from the system boundary 2, i.e. to the right in FIG. 1, a pipeline conveys a compressed injection mixture to a subterranean formation.

The system 100 comprises a control system 200 for controlling the composition of the injecting mixture, which is compressed to a desired pressure by a compressor 110. The system 100 may comprise other parts, e.g. an intercooler 120. The intercooler 120 is a commercially available, standard system component in many compression systems.

The control system 200 comprises a membrane 210 for separating $N_2$ and a mixer 220, e.g. a controllable valve. A sensor 230 is shown downstream from the membrane 210 and mixer 220 to illustrate a feedback loop. The sensor 230 may alternatively be disposed upstream to implement a feed forward loop. Either way, a controller 240 receives input from the sensor 230 and provides a response to an actuator, in FIG. 1 represented by the mixer 220. The controller 240 comprise hardware and software to execute a cybernetic algorithm, e.g. a feedback or feed forward algorithm. The controller and algorithms are known to one skilled in the art.

In the following, we use measured values from a combined cycle as a numerical example. In particular, the initial flue gas from a typical gas turbine contains 5% $CO_2$, 74% $N_2$, 15.5% $O_2$ and 5.5% other components. This $O_2$ content is too high for EOR applications. A secondary step involving a steam generator and a steam turbine provides a reference flue gas containing 11.4% $CO_2$, 86.9% $N_2$, 1% Ar, 0.6% $O_2$ and 0.03% $H_2O$.

This mixture can be passed through a commercially available filter in order to reduce the content of $N_2$. A numerical example is provided in table 1, which is computed from the mixture above using an Aspen Process Simulation System, provided by Air Products Ltd. (www.airproducts.com), with a PA405N1 membrane model.

TABLE 1

| | Membrane filtering of reference flue gas | | | | | |
|---|---|---|---|---|---|---|
| | $N_2$ | $O_2$ | $CO_2$ | $H_2O$ | Ar | Other |
| Released | 49% | 0.2% | 0.4% | — | — | 0.6% |
| Deposited | 36.3% | 1.7% | 10.8% | — | 1.25% | — |

The row 'Released' contain fractions released to the atmosphere, and the row 'Deposited' contains the components that do not pass the membrane, and thus are eligible for injection. Disregarding the fractions released to the atmosphere and noting that the fraction in the 'Deposited' row add to about 50%, it is readily seen that the 'Deposit' fraction or injection mixture contains about 72.6% $N_2$, 3.4% $O_2$, 21.5% $CO_2$ and 2.5% Ar. The value provided for Ar should be interpreted as the fraction of 'other components', e.g. NOx.

An alternative to membrane filtering is to add $CO_2$ from some external source to achieve a fraction of $CO_2$ above 12%, preferably above 20%, in the injection mixture.

Several alternatives for EOR using flue gas as injection fluid have been compared to a base line using water as injection fluid. More particularly, The Eclipse 300 2013.2 software was used for EOR simulations and the Eclipse PVTi 2013 package was applied for the associated PVT models. First, the baseline was established using 5000 m³ at 58 kg/s water injection. Next, flue gas injections was simulated using different gas mixtures and alternating gas injection with water injection. The 'other components' were treated as $N_2$ in the simulations.

The following assumptions, corresponding to sandstone, were made for the reservoir:
Porosity: from 15% to 25%, mean=19%
Permeability: 160 to 650, mean=385 mD
Perm Z=(Perm X)*0.5
Netto-gross: 0.56 to 0.76 (net formation thickness contributing to oil and gas production/gross thickness of formation)
Bottom of well pressure: 68 bars+Δ10 bars
Oil production: 5000 m³/day.

Figure 2:
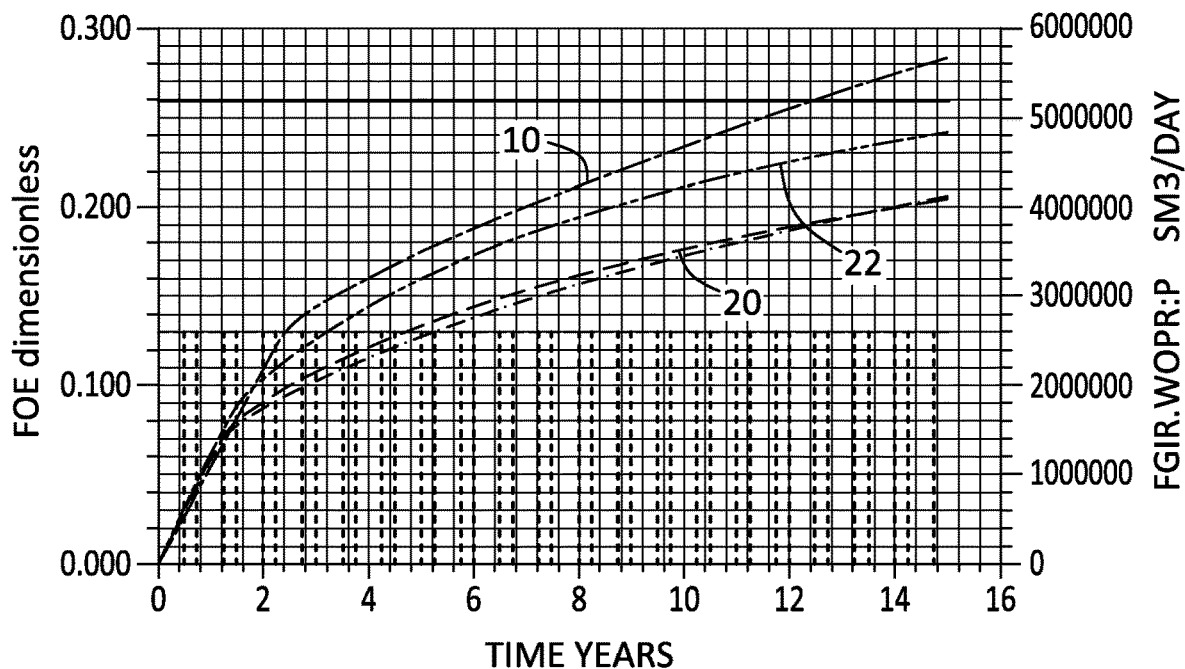
FIG. 2 illustrates efficiency at different injection rates.

FIG. 2 illustrates the oil recovery rate or efficiency as a function of time (15 years). The baseline 10 was obtained using water at a flow rate of 58 kg/s. The efficiency after 15 years is 28%. The curve 20 represents an alternative using flue gas directly, and was obtained using the reference flue gas containing 11.4% $CO_2$ at a flow rate of 40 kg/s. The efficiency after 15 years is 20.5%. Curve 22 was obtained using the reference flue gas, i.e. as for curve 20, but at an increased flow rate of 80 kg/s. This case is actually better up to year 2, but then a breakthrough from injection well to production well caused a large area with poor sweeping effects between the wells, so that gas injection became circulation.

Figure 3:
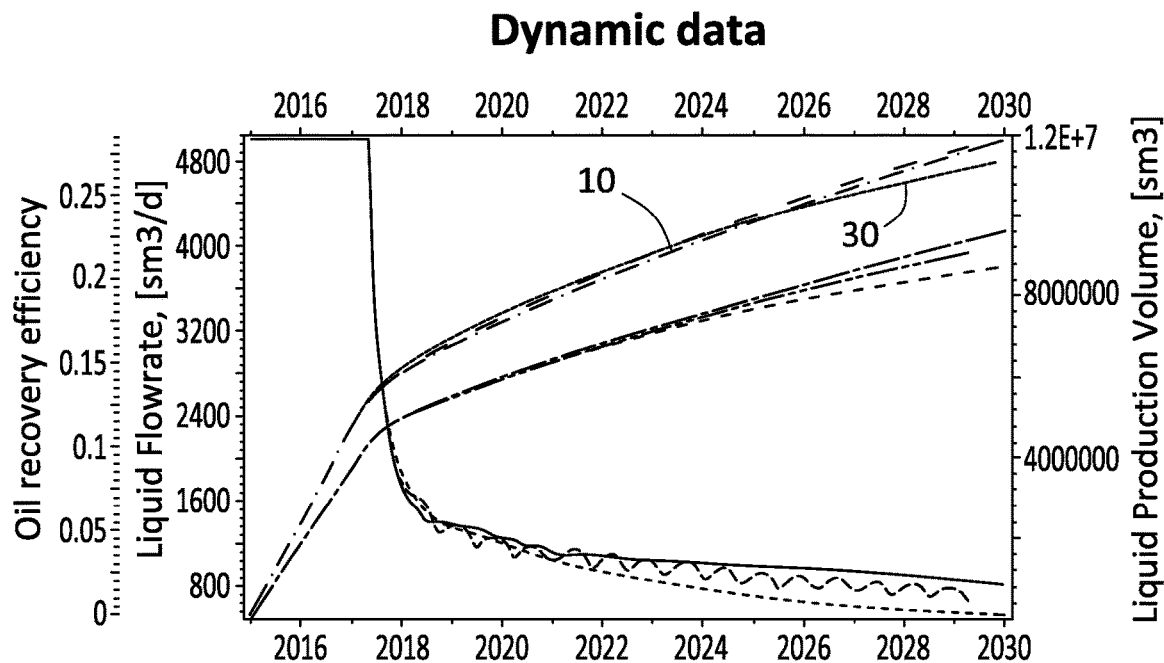
FIG. 3 illustrates efficiency at different $CO_2$ concentrations.

FIG. 3 illustrates the oil recovery rate or efficiency as a function of time (15 years, commencing in 2015), i.e. as in FIG. 2. The baseline 10 represents water injection at 58 kg/s as in FIG. 2. Curve 30 represents a preferred alternative, i.e. a flue gas with increased $CO_2$ content, and was obtained using the injection mixture with 21.5% $CO_2$ specified above at a mass flow rate 17 kg/s. Up to year 11 (2028), the oil recovery rate is identical. The efficiency after 15 years is approximately 27%.

From FIG. 3, it appears that an injection mixture of $N_2$ and $CO_2$, where the $CO_2$ fraction is above 20 mole %, has the same EOR effects as water injection, even with flow rates at ⅓ of the water injection rate.

The above results are generally due to the properties of $N_2$—$CO_2$ mixtures in the range 12% to 90%, in particular to the PVT-properties or phase diagrams. Thus, they may be applicable in other compression applications, e.g. depositing $CO_2$ in aquifers or other subterranean formations.

The invention claimed is:

1. A system for injecting flue gas to a subterranean formation, wherein the system is configured to receive an initial mixture of $N_2$, $CO_2$ and less than 2% other components and to discharge an injection mixture to the subterranean formation, the system comprising:
    a compressor for obtaining and maintaining a predetermined downhole pressure; and
    a control system for achieving and maintaining an amount of $CO_2$ in the injection mixture in the range 20-90%.

2. The system according to claim 1, wherein the compressor and injection mixture are configured for enhanced oil recovery.

3. The system according to claim 1, wherein the control system comprises a membrane for reducing an amount of $N_2$ to achieve and maintain the amount of $CO_2$ in the injection mixture in the range 20-90%.

4. The system according to claim 1, wherein the control system comprises a mixer for adding $CO_2$ from n external source to the initial mixture to achieve and maintain the amount of $CO_2$ in the infection mixture in the range 20-90%.

* * * * *